(12) United States Patent
Gonzaga

(10) Patent No.: US 6,923,200 B2
(45) Date of Patent: Aug. 2, 2005

(54) SAFETY DEVICE FOR PRESSURIZING AN ENVELOPE AT RISK OF BURSTING

(76) Inventor: Tullio Gonzaga, Via Canolo, 41, Correggio (IT), 42015

( * ) Notice: Subject to any disclaimer, the term of this patent is extended or adjusted under 35 U.S.C. 154(b) by 319 days.

(21) Appl. No.: 10/231,739

(22) Filed: Aug. 30, 2002

(65) Prior Publication Data

US 2003/0041901 A1 Mar. 6, 2003

(30) Foreign Application Priority Data

Sep. 4, 2001 (IT) ............................ VR2001A0095

(51) Int. Cl.[7] ............................................. F16K 15/10
(52) U.S. Cl. ........................... 137/224; 141/38; 157/1; 157/14; 152/415
(58) Field of Search ........................ 137/224; 141/38, 141/386; 152/415; 157/1, 14, 15

(56) References Cited

U.S. PATENT DOCUMENTS

| 2,407,049 | A | * | 9/1946 | Winarsky et al. | 157/1 |
|---|---|---|---|---|---|
| 2,835,318 | A | * | 5/1958 | Conger | 157/1 |
| 2,960,130 | A | * | 11/1960 | Smyser | 157/1 |
| 2,962,065 | A | * | 11/1960 | Moore | 157/14 |
| 3,094,156 | A | * | 6/1963 | Breazeale et al. | 157/14 |
| 3,495,647 | A | * | 2/1970 | Branick | 157/1 |
| 4,036,274 | A | * | 7/1977 | Peel, Sr. | 157/1 |
| 4,505,309 | A | * | 3/1985 | Adelman et al. | 157/1 |
| 4,529,019 | A | * | 7/1985 | Blevins et al. | 141/94 |
| 4,765,387 | A | | 8/1988 | Mannen | |
| 4,840,215 | A | * | 6/1989 | Vijay et al. | 157/1 |
| 4,850,402 | A | * | 7/1989 | Cunningham et al. | 141/38 |
| 5,035,274 | A | * | 7/1991 | Kinnick et al. | 137/223 |
| 5,971,053 | A | | 10/1999 | Fisher | |
| 6,173,751 | B1 | | 1/2001 | Magnani | |
| 6,467,524 | B2 | * | 10/2002 | Ronge et al. | 137/223 |

* cited by examiner

Primary Examiner—John Rivell
(74) Attorney, Agent, or Firm—Orum & Roth (57) ABSTRACT

A safety device for inflating an envelope at risk of bursting comprising: a tubular body, a piston element slidably and sealably mounted within at least one inner portion of the tubular body; at least one piston rod integral with the piston element and extending so as to protrude from a first end of the tubular body; an annular bottom member, located in the tubular body or at the first end of the tubular body and suitable for slidably guiding the piston rod and for closing the tubular body whereby delimiting an annular space together with the tubular body and with the piston; removable anchoring device suitable for acting at a protruding end of piston rod and for constraining the piston rod to a support; at least one inlet opening and at least one outlet opening formed in the tubular body at the annular space, in operation said inlet opening being suitable for being connected to a pressurize fluid source and the outlet opening being designed to be connected to the envelope to be pressurized; and a yielding retainer for holding in position the said piston element, so that in case of bursting, the unit formed by the tubular body and the annular bottom member can be moved longitudinally following a bursting impact with respect to the piston element in contrast with the yielding retainer.

23 Claims, 7 Drawing Sheets

SAFETY DEVICE FOR PRESSURIZING AN ENVELOPE AT RISK OF BURSTING

This application claims priority to Italian Application VR2001A000095 filed 04 Sep. 2001.

FIELD OF THE INVENTION

The present invention relates to a safety device for pressurizing and envelope at risk of bursting, particularly for inflating vehicle tires in general.

BACKGROUND OF THE INVENTION

Normally the inflation of a tire after fitting onto a wheel-rim is carried out by placing the wheel onto a supporting platform (usually the rotating platform of a wheel fitting machine) and blowing compressed air into a tire through the suitable inflation valve.

As the pressures involved can be relatively high, if for any reason the tire bursts, shreds of the tire and under extreme circumstances the wheel-rim itself would be thrown upwards, dramatically jeopardizing the operator's safety.

Until now attempts have been made to limit such a risk by resorting to devices e.g. inflation cages. Inflation cages are themselves very effective devices, but they have the drawback to be rather cumbersome and difficult to use, as it is necessary to transfer the tire into a cage (usually manually, thus with a certain effort). The poor practicality of such devices and above all the inertia or laziness of the operator get him to give up using them as he should, with the practical result that he is often exposed to serious safety hazards.

SUMMARY OF THE INVENTION

The main object of the present invention is to provide a safety device for pressurizing an envelope, typically a vehicle tire fitted onto a wheel-rim, that does not discourage the operator from using it for inflating any type of tire, thus ensuring his safety under any circumstance, if not for the fact that it is extremely handy and easy to maneuver.

Another object of the present invention is to have the said safety device operating as a verification instrument that makes it possible to obtain evidence that the same device was not actually used during inflation should a tire bursting take place.

A further object of the present invention is to provide a safety device for tire inflation that can be manufactured at very competitive production costs with respect to the costs of the safety devices currently being used.

These and other objects which will be better apparent below are attained according to the present invention by means of a safety device for pressurizing an envelope at risk of bursting, comprising:

a tubular body or cylinder;

a piston element mounted slidably and sealably within at least one inner section of the said tubular body;

a piston rod integral with the said piston and extending so as to protrude from a first end of the said tubular body;

an annular bottom member arranged in the said tubular body at the said first end thereof and suitable for slidably guiding the said piston rod and for closing the said tubular body, whereby delimiting an inner annular space together with the said piston;

removable anchoring means suitable for acting at the protruding end of said piston rod and for constraining the said piston rod to a support;

at least one inlet opening and at least one outlet opening formed in the said tubular body at the said annular space, the said inlet opening being arranged for being connected to a pressurized fluid source and the said outlet opening being arranged to be connected, in use, to the said envelope to be pressurized;

yielding retention means for holding in position the said tubular body or cylinder so that in case of bursting, the unit formed by said tubular body and said annular bottom member can be moved longitudinally following a bursting impact with respect to the said piston, in contrast with the said yielding retention means.

Advantageously, the specific configuration of the safety device is such that, in operation, the said annular space contains pressurized air so that a cushioning effect is exerted against the upward thrust applied to the said cylinder following an accidental bursting of the envelope.

BRIEF DESCRIPTION OF THE DRAWINGS

Further aspects and advantages of the present invention will be better apparent from the following detailed description of some specific currently preferred embodiments thereof, given by way of illustrating not limiting examples, and with reference to the accompanying drawings, in which:

FIGS. 3a and 3b are each a detail of FIGS. 1 and 2 on an enlarged scale having a different operating arrangement and, more particularly, FIG. 3a shows the safety device in an operating arrangement, whereas FIG. 3b illustrates the same device in a bursting configuration;

In the accompanying drawings the same or similar parts or components have been indicated by the same reference numerals.

DESCRIPTION OF THE PREFERRED EMBODIMENTS

With reference first to the embodiment shown in FIGS. 1 to 5, it will be noted that a safety device according to the present invention, generically indicated at 1, comprises a hollow cylindrical body or cylinder 2, preferably made of steel or light alloy, within which a piston 3 is slidably mounted, around which one or more annular grooves are formed for receiving a respective sealing gasket 4. Piston 3 is provided with a first piston rod 6, which extends so far as to protrude from a first end 5 of cylinder 2 and has a predetermined minimum length, as it will be further explained below. Piston rod 6 comprises two sections having a circular cross-section but different diameters: a first section 7 with a greater diameter is connected to piston 3, whereas the second section 8, with a smaller diameter, is connected to the first section 7, preferably through an intermediate frusto-conical portion 9.

Figure 1:
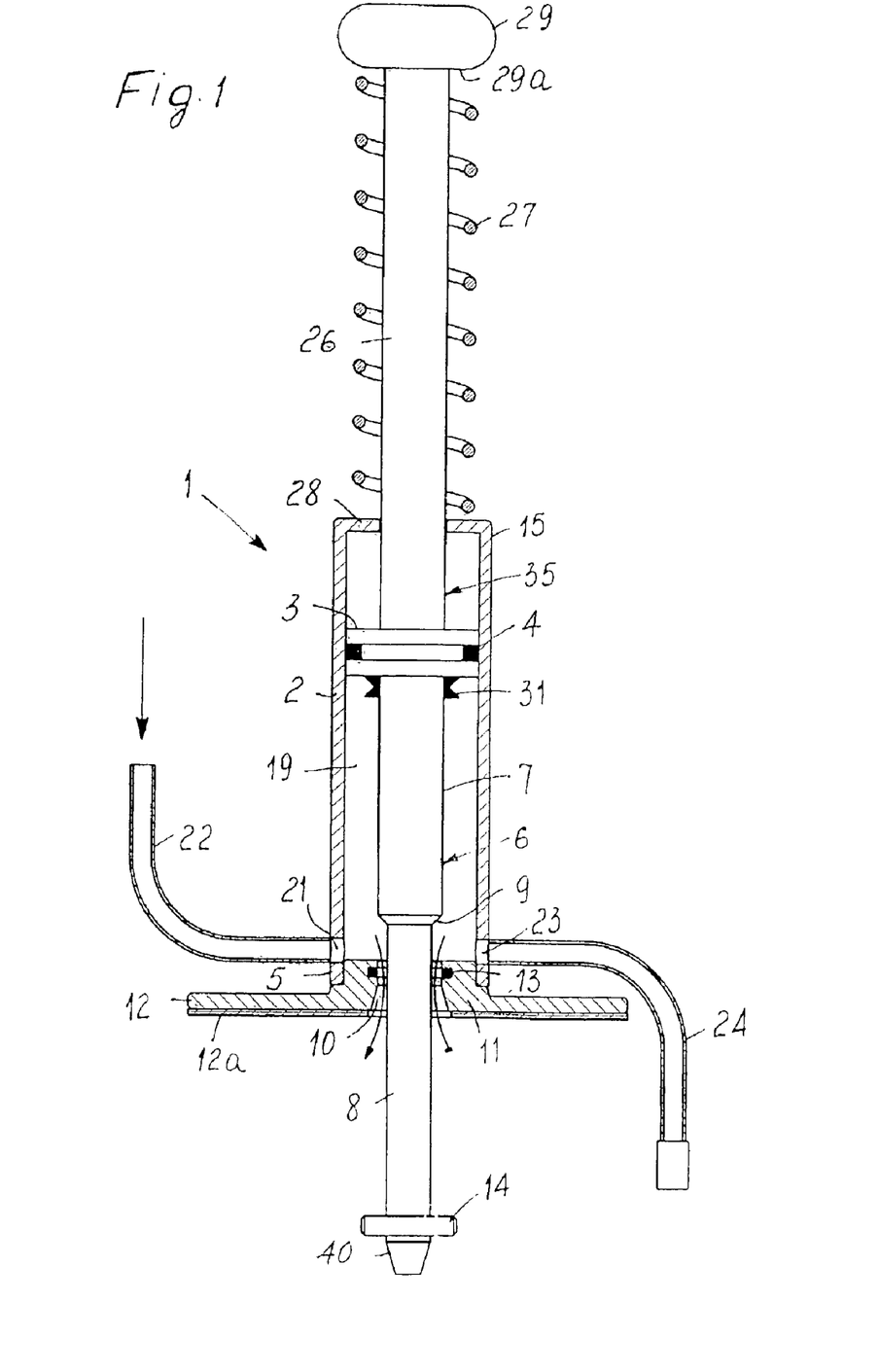
FIG. 1 illustrates an elevation and longitudinal axial section view of a safety device according to the present invention in an idle or not operating configuration.
Figure 2:
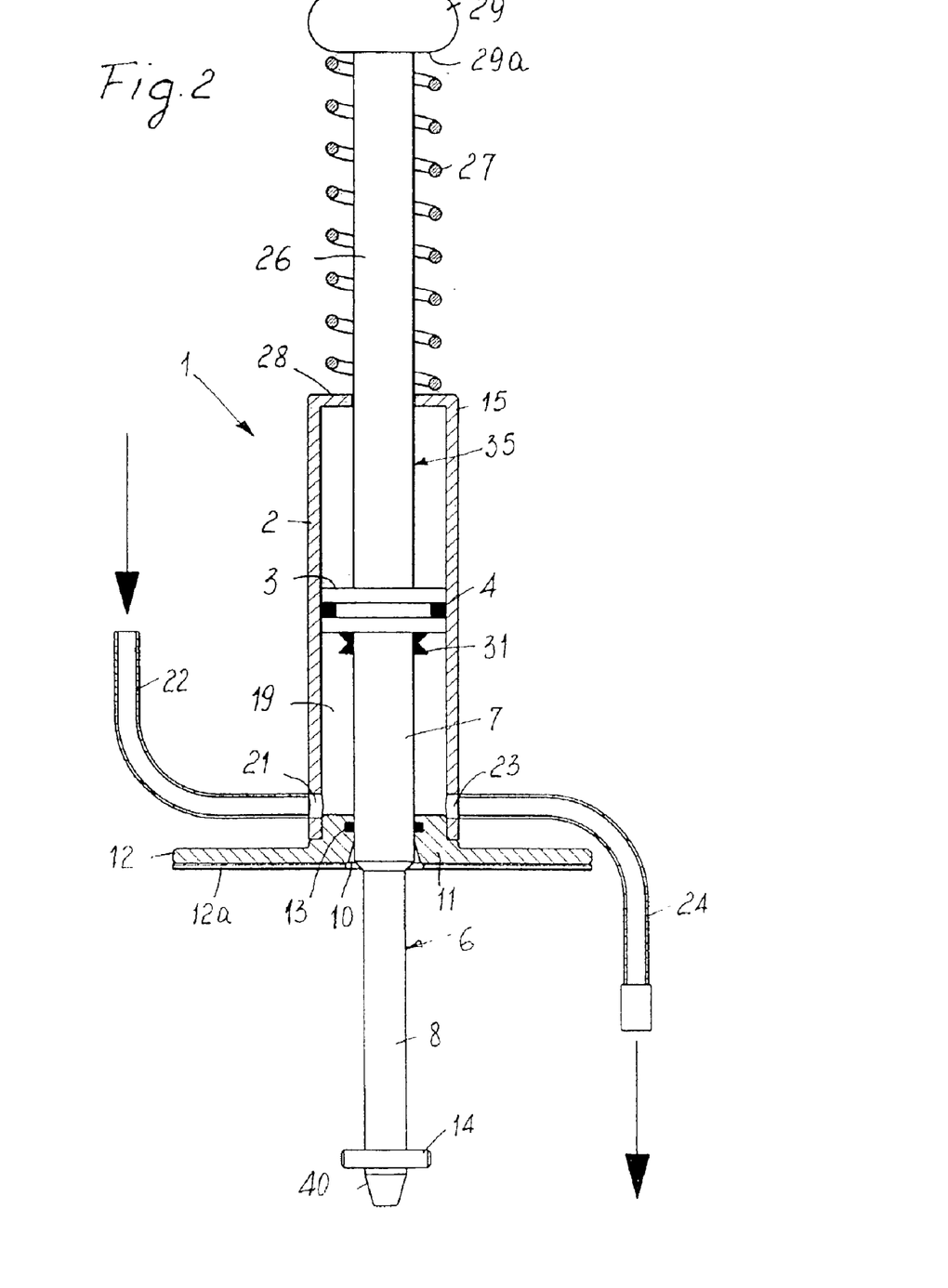
FIG. 2 shows an elevation and longitudinal axial section view of the safety device of FIG. 1 in an operating configuration.

An annular bottom member 11 (hereinafter termed bottom for expediency), advantageously provided with a flange 12, preferably outwardly covered with a soft material layer 12a, is inserted into cylinder 2 or somehow arranged in such a way as to close the light thereof at end 5. Bottom 11 has a through-hole 10, in which section 7 of piston rod 6 can sealably slide. Hole 10 is provided with one or more inner sealing gaskets 13, each of which is located in a respective annular groove peripherally formed in the hole 10.

At the free or distal end of section 8 of piston rod 6 an engagement member is provided, e.g. a cross pin 14, that is a component of the retaining means for providing a removable bayonet joint connection (as it is better shown in FIG. 5) with a suitable slot 16, e.g. formed in a metal bracket 17 fixed to a support 18 (FIG. 4), that can be e.g. a rotating platform of a tire fitting machine (not shown in the drawings).

Figure 11:
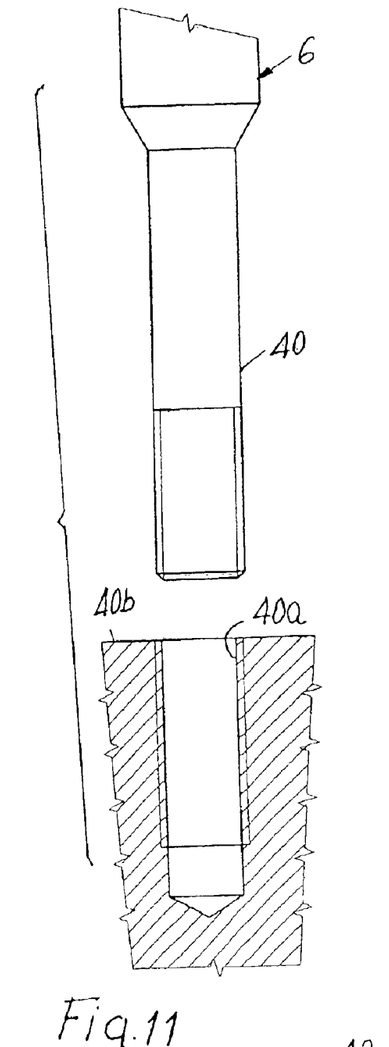
FIG. 11 shows a detail on an enlarged scale of a variation of the retaining means.

According to a structural variation, distal end 40 of piston rod 6 is threaded and designed to be screwed into a threaded hole 40a, e.g. formed in a block 40b (FIG. 11) inserted in the rotating platform 18 of a tire fitting machine.

If desired, the distal end 40 of the piston rod 6 has a threaded head hole 40c into which a threaded pin 40d can be screwed, that protrudes from the block 40b carried by the rotating platform 18 (FIG. 12) can be screwed.

Figure 4:
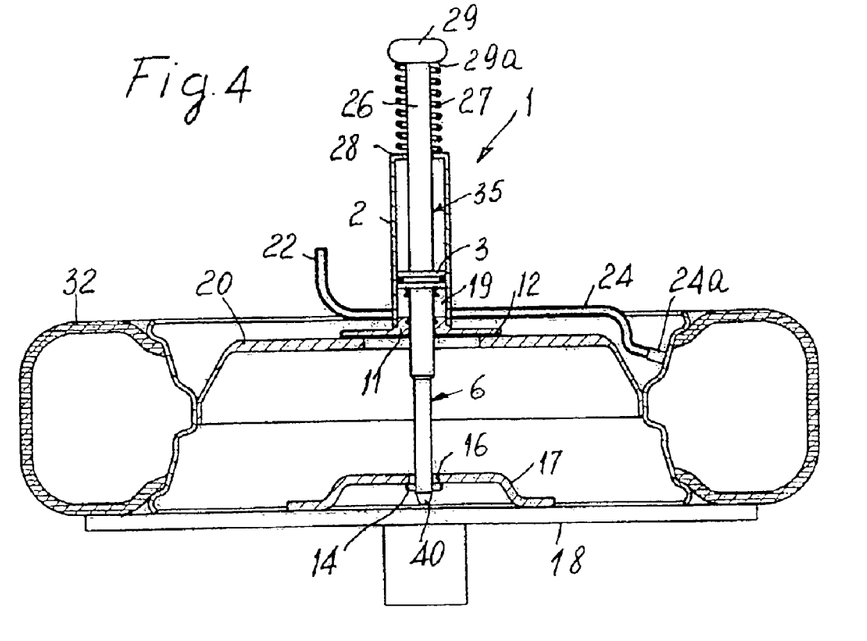
FIG. 4 shows a view similar to that of FIG. 1 but illustrating a safety device in an operating position for inflating a vehicle tire fitted onto a wheel-rim.

The bottom 11 and piston 3 delimit an annular space 19 in the cylinder 2, at which at least one or more inlet openings 21 are formed, each of which being designed, in use, to be connected to a pressurized fluid source (not shown, e.g. a compressed air tank) through a suitable inlet duct 22, and one or more outlet openings 23 arranged to be connected through a suitable outlet duct 24 to an inflation valve, generally indicated at 24a in FIG. 4, provided on a tire 32 to be inflated (fitted onto a wheel-rim 20).

On the side opposite to the piston rod 6, piston 3 is provided with a second piston rod 26 that, in turn, extends so as to protrude through the other end 15 of the cylinder 2 to a sufficient extent to accomplish all the maneuvers of the device, as it will be better apparent below. Piston rod 26 is advantageously thicker at its free end 29 so as to form a knob or handle and delimit an abutting shoulder 29a.

As [it] is better shown in FIGS. 1 and 2, a helical spring 27 is also provided, which is wound around the protruding portion of the piston rod 26 and acts as a yielding retention means. More particularly, spring 27 can abut against a cross-member 28 fixed at the second end 15 of cylinder 2 (or directly against the end 15) and it is designed to react against the abutting shoulder 29a of knob 29.

According to another embodiment, not shown in the drawings, spring 27 can be seated within cylinder 2 where it is constrained to the stem 26 close to piston 3 on the one side, and to the cylinder 2 close to the end 15 thereof or to the cross-member 28, on the other side, in such a way as to operate in traction rather than in compression.

An annular yielding member 31 (hereafter termed "ring" for expediency) made of a plastically deformable material, when subjected to a sufficiently high threshold pressure is mounted on piston rod 6. In the shown embodiment, ring 31 has advantageously a "V" shaped cross-section and is preferably arranged in abutment onto the piston 3.

The above described safety device 1 operates in the following way.

Figure 5:
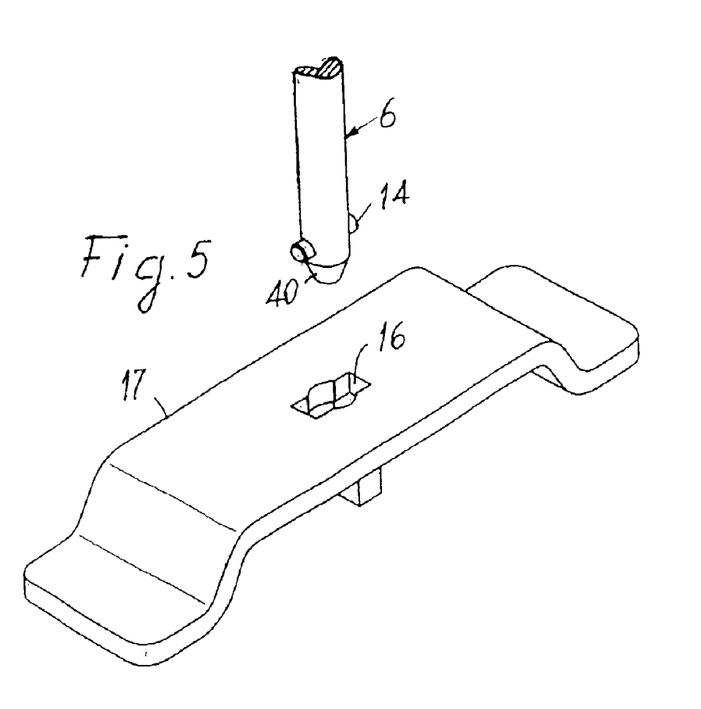
FIG. 5 shows a partial perspective view on an enlarged scale of a detail, i.e. of the retention means shown in FIG. 4.

A tire 32 to be inflated, previously fitted onto a wheel-rim 20, is positioned onto the rotating platform 18 of a tire fitting machine. The operator then proceeds by placing the flanged bottom member 11 onto the axial hole of wheel rim 20 with interposition of the soft layer 12a thereof to avoid damages such as scratches to the wheel-rim, and, while exerting a force onto knob 29 he compresses the spring 27 causing the piston rod 6 to extend out of cylinder 2 to such an extent that the distal end 40 of piston rod 6 with its respective pin 14 enters the slot 16 in order to bring the piston rod into engagement with the bracket 17 beyond the slot 16. The piston rod 6 is then rotated through approximately 90° by acting on handle 29 to obtain a bayonet joint connection, as shown in FIG. 5, after which spring 27 will maintain the necessary resilient load for keeping the rod-like unit 35 (comprising piston rod 6, piston 3 and piston rod 26) in traction.

The lengths of the sections 7 and 8 of piston rod 6 are such that, once the coupling between end 40 and bracket 17 has been completed, section 7 having a greater diameter than that of the piston rod 6 is moved to reach hole 10, and thus the annular space 19 is sealably closed at the hole 10 and inflation can take place.

The annular space 19 is then connected to the pressurized fluid source through a flexible duct 22 and to the inflation valve 24a of tire 32 through flexible conduct 24. The inflating operation can take place in a quick and quite easy way.

The safety device 1 therefore is responsible for both anchoring of the wheel-rim 20 to support 18 and the inflation of tire 32.

In case coupling between piston rod 6 and bracket 17 has failed, spring 27 causes piston rod 6 to be withdrawn in such a way that section 8 finds itself at the hole 10 formed in the bottom member 11, and thus the sealing fails, which means that space 19 leaks, but in any case there would be no risk of bursting.

In case of proper coupling and of an accidental pressure build-up that causes bursting of tire 32, wheel-rim 20 will tend to be lifted or in any case to be detached from platform 18.

The moving unit comprising wheel-rim 20, bottom member 11 and cylinder 2 is thus subjected to an abrupt displacement with respect to the rod-like assembly 35 (including piston 3 and piston rods 6 and 26), but such movement is contrasted by the joint action of spring 27 and compressed air inside annular space 19 that cushions and dampens the effect of the bursting impact and assists in holding tire 32 anchored against platform 18.

Figure 3A:
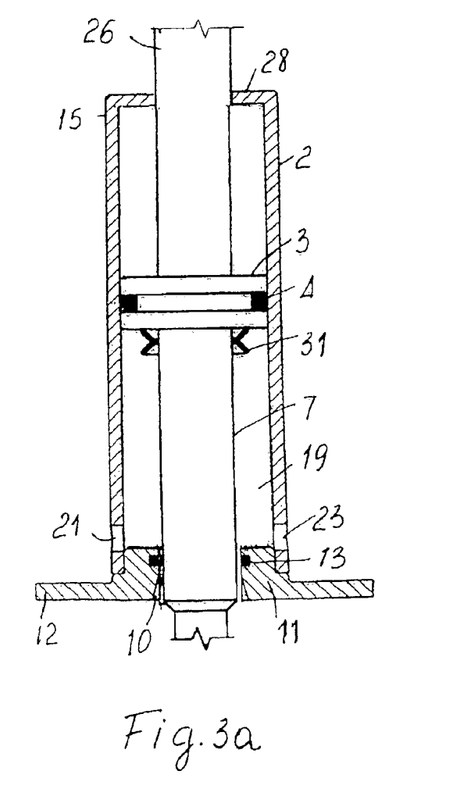
Figure 3B:
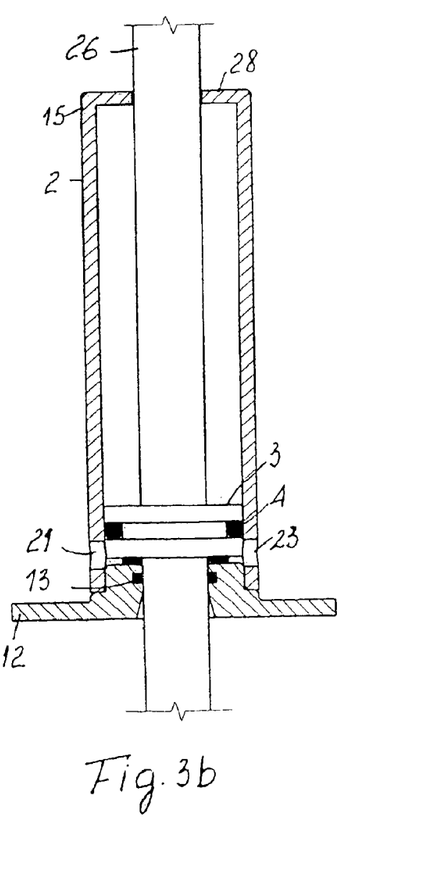

Should the tire 32 burst, ring 31 is compressed between piston 3 and bottom member 11, thus remaining permanently deformed, as shown in FIG. 3b, so that it acts as a reliable evidence proving whether safety device 1 has been used or not while carrying out the inflation of burst tire 32. If ring 31 results to be undamaged after bursting, that would mean that safety device 1 was not used in the inflation process.

Figure 6:
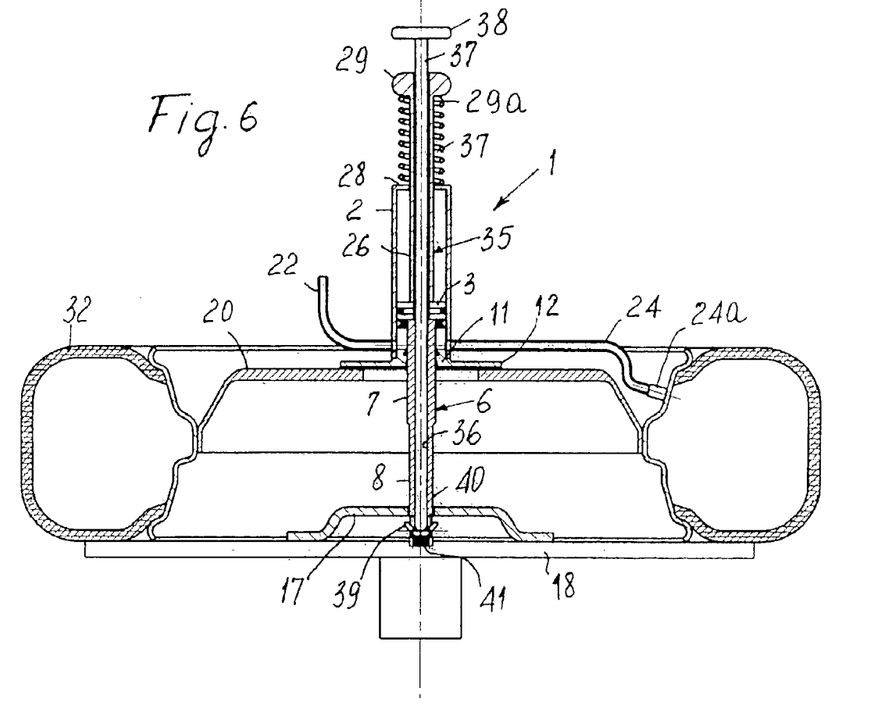
FIG. 6 illustrates a diametrical cross section view of another embodiment of the safety device according to the present invention applied for inflating a vehicle tire fitted onto a wheel-rim.
Figure 7:
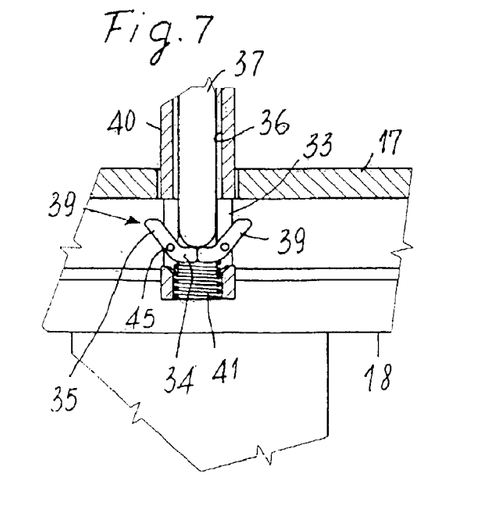
FIG. 7 illustrates the retention means of the safety device of FIG. 6 in its hooked arrangement.
Figure 8:
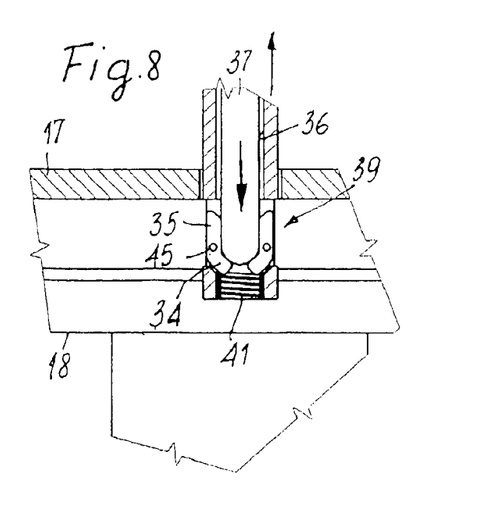
FIG. 8 shows the retention means of FIG. 6 in its releasing or disengagement configuration.

FIGS. 6 to 8 illustrate a second embodiment of the present invention that essentially differs from the first embodiment in so far as the anchoring or retention system of piston rod 6 to support 18 is concerned. In this case, the rod-shaped assembly 35 has an axial through-cavity 36 into which a suitable control rod 37 that extends throughout the length of cavity 36 can be inserted and is preferably provided with a thickening or knob 38 outside the knob or proximal end 29.

The distal end 40 of hollow piston rod 6 has at least two side openings 33 acting as receiving seats for as many wings 39 articulated to the piston rod wall 6 about a respective transverse pin 45. Each wing 39 is substantially shaped as a bell-crank lever and comprises a first (short) portion 34 and a second (long) portion 35, the latter portion being arranged to be at an angle with respect to the former portion, and having substantially the same thickness as that of the hollow end wall 40 of piston rod 6 and at which the wing is hinged. The swiveling of the wings about their respective pivot pins 45 is limited on closing by contact between the short portion 34 and the tubular body of piston rod 6, and, on opening, when wings 39 end up abutting against one another at the free ends of portion 34 of each wing 39.

More particularly FIG. 7 shows end 40 of piston rod 6 completely inserted into bracket 17 and with wings 39 kept in an open configuration by a spring 41 fixed at one end thereof to the end 40 or to support 18 and acting against portion 34 of wings 39 at portion 34 of each wing 39.

FIG. 8 shows the extraction or disengagement configuration or pattern of end 40 from bracket 17, where wings 39 are actuated to closure by inserting suitable control rod 37 into cavity 36 of the tubular structure of the rod-like assembly 35. The control rod 37 acts at its head against portion 34 of each wing 39 thereby causing it to be upturned inside its respective side opening 33, in contrast with the force of spring 41.

At this point it is possible to insert or extract piston rod 6 as wings 39 are contained within the encumbrance of piston rod 6.

It will be noted that in this embodiment, cross-sections that are even different from the circular cross-section can be adopted for tubular body 2 and for the elements forming the rod-like assembly 35.

Figure 9:
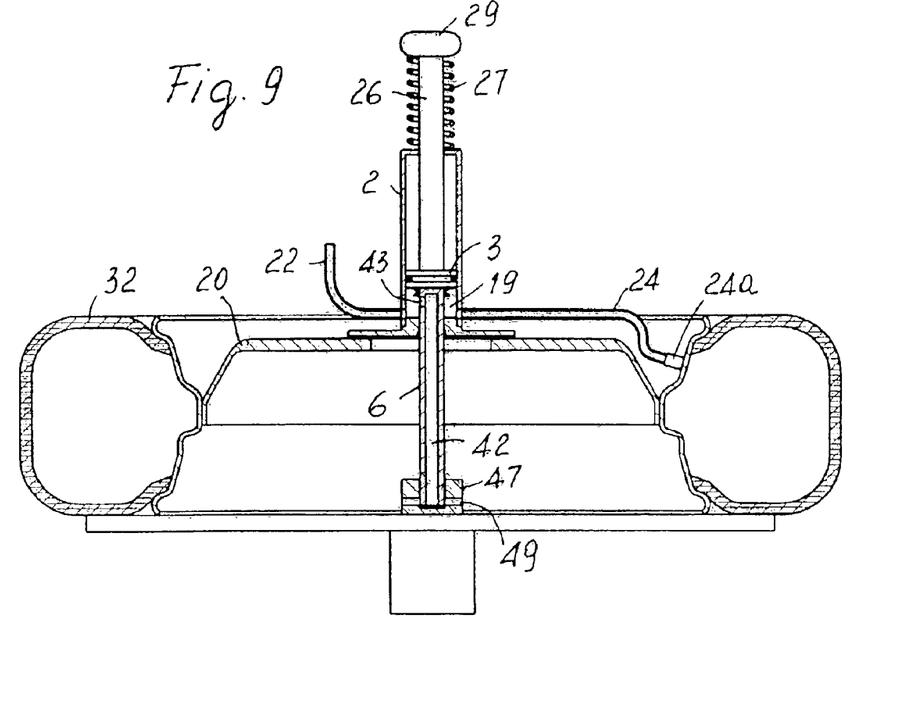
FIG. 9 is a view similar to that of FIG. 5 but illustrating another embodiment of retaining means.
Figure 10A:
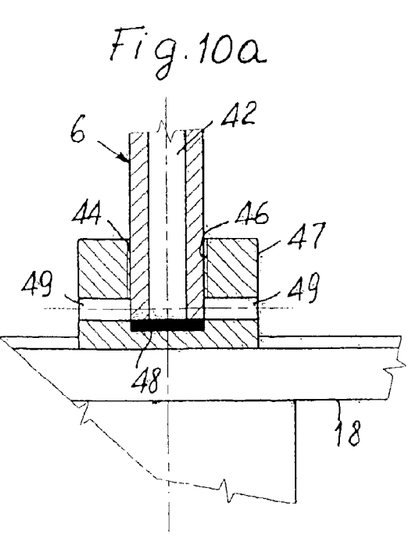
FIGS. 10a and 10b each illustrate an elevation and longitudinal axial view of the retaining means of FIG. 9.
Figure 10B:
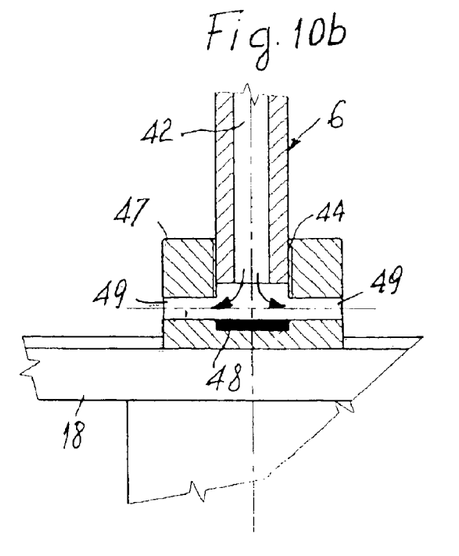

FIGS. 9, 10a and 10b show another embodiment of the present invention, in which the retention or anchoring means to the support 18 is provided with a piston rod 6 having one outer diameter and arranged to sealably slide inside hole 10 of bottom 11. As illustrated in greater detail in FIGS. 10a and 10b, in lieu of bracket 17, a block 47 is provided in which a threaded blind hole 46 is formed, into whose bottom a seal 48 is seated, and in which one or more side vent holes 49 are provided. Piston rod 6 is inwardly hollow (cavity 42) and it communicates with annular space 19 through one or more side holes 43 formed close to piston 3. At its distal end, piston rod 6 has an outwardly threaded portion 44 designed to be screwed into threaded hole 46 of block 47 fixed (e.g. welded) to support 18.

Piston rod 6 must be tightly screwed into threaded hole 46 in order to exert the necessary pressure onto head seal 48, so that it sealably obstructs passage for the compressed air contained in inner cavity 42 of piston rod 6, which is in communication with space 19. In case tight screwing of stem 6 fails, compressed air from inner annular space 19 flows through inner cavity 42 of piston rod 6 and comes out through side vent duct or ducts 49 formed in the seat 47, thus preventing tire 32 from being inflated.

Of course, in this embodiment piston rod 6, piston 3 and the tubular body 2 are necessarily cylindrical in shape.

Figure 12:
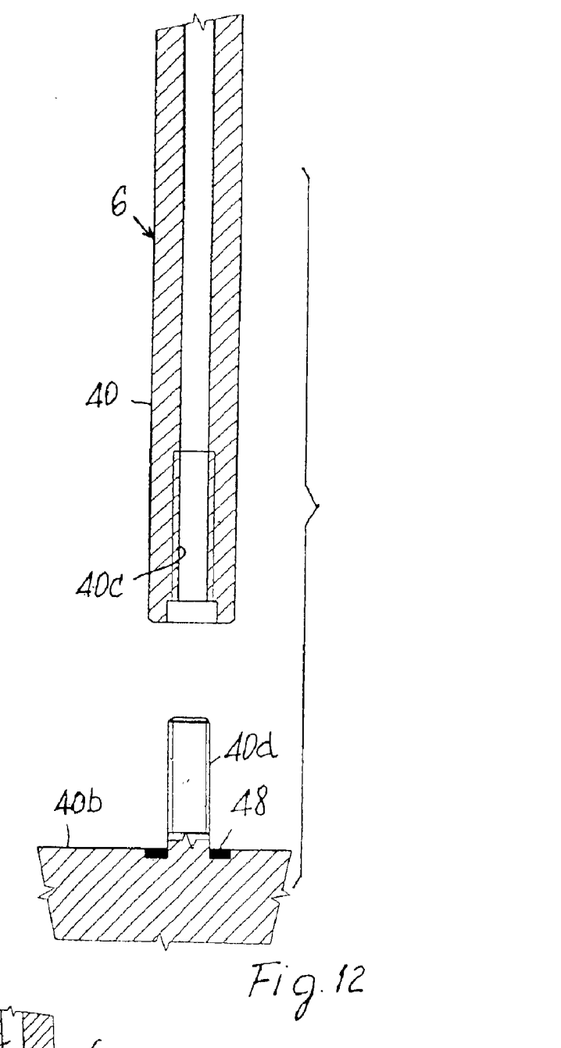
FIG. 12 illustrates another variation of the holding means.

According to another embodiment, end tip 40 of hollow piston rod 6 can have an end inner threading section designed to be screwed onto a pin that is integral with support 18 and protruding therefrom, about which an annular seal 48 is arranged for abutment of piston rod 6 (FIG. 12).

Figure 13:
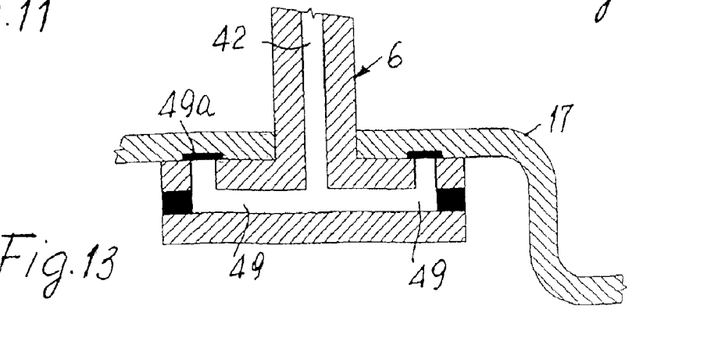
FIG. 13 shows a partial cross section view of a further embodiment of the retaining means.

According to another embodiment shown in FIG. 13, a bayonet joint connection between hollow piston rod 6 and bracket 17 can be provided. From a constructional viewpoint, end 40 of stem 6 is provided with a cross-head suitable for passing through slot 16 (as in FIG. 5) but on the opposite side it is provided with one or more a side ducts or vent holes 49 leading to support bracket 17 at one or more seals 49a located in a suitable seat formed in the bracket 17, whereby ensuring that seal is accomplished only when the said cross-head is abutting against seals 49a.

The disclosure in Italian patent application No. VR2001A000095 from which priority is claimed is incorporated herein by reference.

What is claimed is:

1. A safety device for inflating an envelope at risk of bursting comprising:
    a tubular body;
    a piston element mounted slidably and sealably to slide within at least one inner section of the tubular body;
    a piston rod integral with the piston and extending so as to protrude from a first end of the tubular body;
    an annular bottom member, arranged in the tubular body or at the first end thereof and suitable for slidably guiding the piston rod and for closing the tubular body, whereby delimiting an inner annular space together with the piston;
    removable anchoring means suitable for acting at the protruding end of the piston rod and for constraining the piston rod to a support;
    at least one inlet opening and at least one outlet opening formed in the tubular body at the annular space, the inlet opening being suitable for being connected to a pressurized fluid source and the outlet opening being arranged to be connected, in use, to the envelope to be pressurized; and
    yielding retention means for holding in position the piston element, so that in case of bursting, the unit formed by said tubular body and said annular bottom member, can be moved longitudinally, following a bursting impact, with respect to the piston element in contrast with the yielding retention means.

2. A device as claimed in claim 1, wherein the piston rod comprises a first section having a greater diameter and arranged adjacent to the piston element, and a second section having a smaller diameter, the first section being arranged to sealably slide through said bottom, whereby ensuring the sealing of said annular space when the second section has protruded out of the bottom to a sufficient extent.

3. A device as claimed in claim 2, wherein between the first section and the second section of the piston rod a substantially frusto-conical intermediate section is provided.

4. A device as claimed in claim 1, wherein the piston rod is hollow and has at least one opening communicating with the annular space close to the piston element and wherein a receiving seat for locating the piston rod is provided with a seal against which said piston rod sealably abuts when the piston rod is engaged with the support.

5. A device as claimed in claim 1, wherein the retention means comprises at least a male member or a female opening on the piston rod and a female member or a male object on the support so as to make it possible to obtain a bayonet joint connection.

6. A device as claimed in claim 5, wherein the retention means comprises a threaded end portion of the piston rod and a threading in or on a screwing member for the threaded end portion integral with the support.

7. A device as claimed in claim 6, wherein the screwing member comprises at least a vent duct.

8. A device as claimed in claim 6, wherein the end portion is outwardly threaded.

9. A device as claimed in claim 1, wherein the piston rod is formed with a threaded end hole suitable for being screwed onto a threaded pin protruding from the support.

10. A device as claimed in claim 5, wherein the male member of the piston rod comprises at least a side duct leading, on the opposite side, to the support at the at least one seal, and a bracket integral with the support, in which a seat is formed for receiving each seal, thereby ensuring the sealing only when the male member is abutting against the or each seal.

11. A device as claimed in claim 4, comprising a block element fixed to the support and formed with a hole in which a threading is obtained and in that the hole communicates with the vent ducts, so that sealing is ensured only when the male element abuts against the or each seal.

12. A device as claimed in claim 6, wherein the end portion has a threaded end hole and wherein the threading is formed on a pin protruding from the support around which the seal is located, so that sealing is ensured only when the end portion abuts against the at least one seal.

13. A device as claimed in claim 2, comprising an uninterrupted longitudinal cavity delimited by the first piston rod and the piston element, a control rod at least coextending with the cavity, slidably mounted within the cavity and protruding out of the piston element, a receiving opening for said distal end of the piston rod formed in the support and expansible anchoring means designed to be controlled by the control rod and arranged at the said end.

14. A device as claimed in claim 1, further comprising a second piston rod extending from the piston element on the side opposite to the first piston rod.

15. A device as claimed in claim 14, wherein the second piston rod is outwardly provided with manual actuation means for tubular body.

16. A device as claimed in claim 14, comprising an uninterrupted longitudinal cavity delimited by the first piston rod, said piston element, and said second piston rod, a control rod, at least coextensive with the cavity, slidably mounted therewithin and protruding out of said second piston rod, an opening for receiving said distal end of the piston rod formed in the support and expansible anchoring means controlled by said control rod and arranged at the end.

17. A device as claimed in claim 1, wherein the yielding retention means comprises compressed air contained in the inner annular space.

18. A device as claimed in claim 1, wherein the yielding retention means comprises resilient retention means.

19. A device as claimed in claim 18, wherein a second piston rod extends from the piston on the side opposite to the first piston rod and wherein the resilient means comprises a helical spring arranged around the second piston rod and designed to act between the second piston rod and the tubular body.

20. A device as claimed in claim 19, wherein the resilient retention means comprises a helical spring which is arranged around the second piston rod, inside the tubular body and, on the one side, constrained to it and, on the other to the second piston rod or to the said piston element, so as to operate in traction.

21. A device as claimed in claim 18, wherein the resilient retention means acts as resilient loading means.

22. A device according to claim 1, characterized in that it further comprises a witness memory element mounted onto the first piston rod close to the piston and made of a plastically deformable material which becomes deformed upon an impact beyond a predetermined pressure threshold.

23. A device according to claim 1, characterized in that the bottom is arranged at the first end of the tubular body and has a flange acting as a support and abutment.

* * * * *